Nov. 9, 1948.
A. B. HUBBARD
2,453,131
REFRIGERATING SYSTEM
Filed June 28, 1947
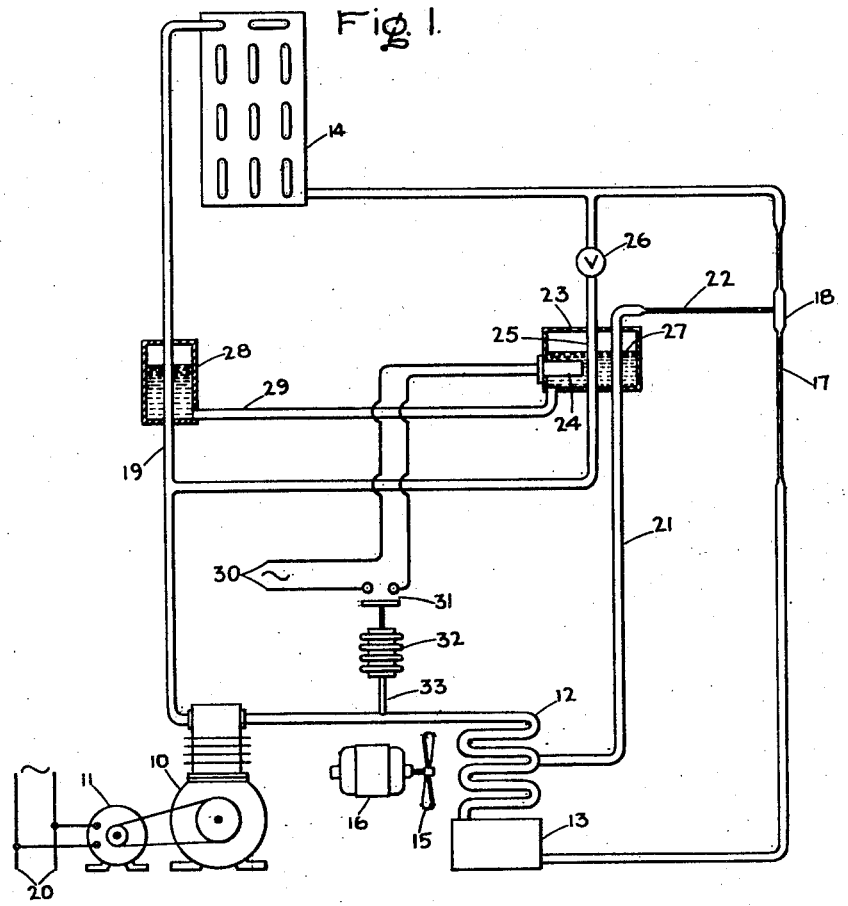
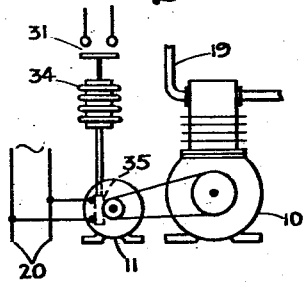
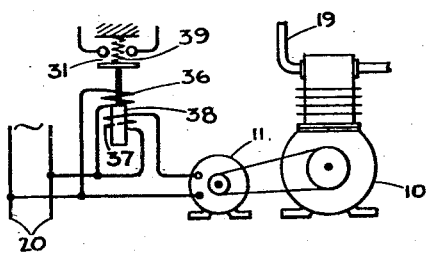
Inventor:
Albert B. Hubbard,
by Edwin L. Rich
His Attorney.

Patented Nov. 9, 1948

2,453,131

UNITED STATES PATENT OFFICE 2,453,131

REFRIGERATING SYSTEM

Albert B. Hubbard, Caldwell, N. J., assignor to General Electric Company, a corporation of New York Application June 28, 1947, Serial No. 757,888

9 Claims. (Cl. 62—8)

My invention relates to refrigerating systems and particularly to the control of the flow of refrigerant in refrigerating systems of the compression type having restricting tubes for controlling the flow of liquid refrigerant to the evaporator.

In refrigerating systems such as those employed for air conditioning, the flow of liquid refrigerant from the liquid receiver or condenser to the evaporator may be controlled by a restricting tube, commonly called a "capillary." The motor for driving the compressor of such refrigerating system is normally designed to carry the maximum load of the system and is underloaded during the greater portion of the normal operation of the system. For example, in air conditioning installations which are provided with refrigerating systems having air cooled refrigerant condensing units, the maximum load which the motor must carry is determined by the maximum temperature and humidity conditions of the ambient air. Thus on hot, humid days the motor is required to carry its maximum load, whereas during normal summer conditions the load may be materially lower. The full capacity of the motor in such systems is, therefore, not used to greatest advantage. In my copending application Serial No. 711,087 filed November 20, 1946, and assigned to the same assignee as the present invention, there are disclosed and claimed refrigerating systems employing single flow control devices which automatically maintain the motor load substantially constant and thereby more effectively use the motor capacity throughout the periods of operation of the system. It is desirable that a control of the type disclosed in my aforesaid application be employed in refrigerating systems having restricting tube flow control devices, and accordingly it is an object of my present invention to provide a refrigerating system having a restricting tube flow control device and including an improved arrangement for controlling the flow of liquid refrigerant through the device in accordance with the operating conditions of the system.

It is another object of my invention to provide a refrigerating system having a restricting tube flow control device and including a motor-driven compressor, together with an improved arrangement for regulating the flow of liquid refrigerant through the device in accordance with motor load conditions to maintain substantially constant the load on the motor throughout the operating range of the system.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 represents diagrammatically a refrigerating system embodying my invention, and Figs. 2 and 3 illustrate modifications of the system shown in Fig. 1.

Referring now to the drawing, the system disclosed in Fig. 1 comprises a refrigerant compressor 10 driven by an electric motor 11 and connected in a closed refrigerant circuit including a condenser 12, a liquid receiver 13 and a finned tube evaporator 14. During the operation of the system, hot compressed refrigerant discharged from the compressor 10 flows to the condenser 12 where it is cooled by the circulation of air produced by operation of a fan 15 driven by a motor 16. The refrigerant is cooled and liquefied in the condenser and flows to the liquid receiver 13 from which it flows to the evaporator under control of a restricting tube 17 having an enlarged portion 18 intermediate the ends thereof. The liquid refrigerant is vaporized by the absorption of heat from air circulated over the evaporator 14 and the vaporized refrigerant is returned to the compressor through a suction line 19. The system is operated by any suitable control (not shown) which may be responsive to the temperature or humidity of the air within a space to be conditioned and which energizes the motor 11 whenever there is a demand for cooling, the control being arranged to energize motor supply lines 20 for this purpose. During the operation of the system the restricting tube 17 maintains the pressure difference between the high and low pressure sides of the system, and liquid refrigerant flows through the tube 17 as long as there is a pressure difference between the ends of the tube. When the temperature of the ambient air circulated over the condenser 12 varies, the pressure within the condenser varies accordingly, and consequently, under different ambient air conditions, the pressure across the restricting tube also varies. Refrigerating systems of the type shown have been provided heretofore with compressor driving motors designed to maintain a predetermined maximum load under the most adverse ambient air conditions and consequently these motors have been underloaded and their full capacity has not been used throughout the major portion of the operating season. In order that the motor 11 may be utilized more nearly at its rated capacity throughout the operating periods of the system, I provide a control arrangement for regulating the flow of refrigerant through the tube 17 in a manner such that the load on the motor is maintained substantially constant whenever the system is operated. This control arrangement includes a by-pass conduit 21 connected to the condenser 12 at a portion containing high pressure refrigerant vapor and having its other end connected to the enlarged portion 18 of the tube 17. The end of the bypass 21 adjacent the tube 17 is formed as a restricting tube, as indicated at 22, and limits the rate of flow of gas through the by-pass. When refrigerant is admitted to the tube 17 through the bypass 21, it varies the rate of flow of refrigerant through the tube 17. If vaporized refrigerant is admitted to the tube 17 the flow therethrough is reduced, whereas the admission of high pressure liquid refrigerant may increase the flow of refrigerant through the tube 17.

In order to control the flow of refrigerant through by-pass 21 so that either liquid or gaseous refrigerant may be admitted to the tube 17, I provide a heat exchange unit including a tank or container 23 with which a portion of the by-pass is in heat exchange relationship. Within the container 23 there is also arranged an electric heater 24 and a cooling conduit 25 constituting a portion of the low pressure side of the system. The cooling conduit is supplied with liquid refrigerant from the liquid line of the evaporator 14 between the outlet of the tube 17 and the evaporator. The amount of flow of liquid through the conduit 25 may be determined by a manually adjustable valve 26. The conduit 25 provides a by-pass around the evaporator between the liquid line and the suction line 19. The heat exchange tank 23 contains a body 27 of volatile liquid, such as refrigerant, and the level of the liquid may be varied by flow between the container 23 and a second container 28 arranged in heat exchange relationship with the suction line 19, the lower portions of the two containers being connected by a conduit 29 so that liquid refrigerant may flow from one to the other. It will be apparent that by varying the pressure of the vapor in the two containers, liquid refrigerant may be forced from one to the other. The two containers connected by the conduit 29 constitute a closed chamber having two portions, one in heat exchange with the suction line and the other in heat exchange with the by-pass 21 and the conduit 25. When there is liquid in the container 23, heat exchange takes place between the conduit 21 and the conduit 25 to cool the refrigerant passing through the by-pass. The system is designed so that the heat exchange is sufficient to partly condense the refrigerant by-passed from the condenser to the tube 17 when there is a substantial amount of liquid in the container 23, as shown in the drawing. By energizing the heater 24, vapor in the container 23 is expanded and some further refrigerant vaporized, and the liquid is displaced and flows to the container 28. The heat transfer between the tube 17 and the liquid in the container 23 thus is changed by variation of the height of liquid in the container. Under this condition, hot refrigerant gas flows through the restricting tube 22 to the tube 17. The heat exchanger 28 also affects the distribution of volatile liquid between the containers 23 and 28, the capacity of the exchanger 28 being designed so that in the event there is a substantial decrease in suction line temperature, liquid is withdrawn from the container 23 by the cooling and condensation of vapor in the container 28; and in the event that liquid refrigerant flows through the suction line, substantially all the liquid will be withdrawn from the container 23. It will thus be apparent that the arrangement of the heat exchangers 23 and 28 is such that a regulating control is effected depending upon the temperature of the suction line 19. By controlling the energization of the heater 24 a further control of the system may be provided, and in the arrangement illustrated the heater is energized by connection across supply leads 30 upon closing of a switch 31. The switch 31 is actuated by a bellows 32 connected by duct 33 with a discharge connection between the compressor 10 and the condenser 12. Thus when the discharge pressure reaches a predetermined high value, the switch 31 is closed to energize the heater 24. The resultant heat forces liquid refrigerant from the container 23 and decreases or stops the heat interchange between the by-pass 21 and the cooling conduit 25. High pressure refrigerant gas is then admitted to the tube 17 and reduces the flow of refrigerant therethrough, thereby decreasing the effective capacity of the evaporator 14 and consequently decreasing the load on the compressor 10 and its driving motor. It will thus be apparent that the operation of the system can be selected so that a predetermined average load is maintained on the motor 11 by regulating the flow of liquid refrigerant through the tube 17. The discharge pressure of the compressor is a measure of the load of the motor 11 and consequently the system is controlled in accordance with a motor load condition.

It will be understood that the illustration of the containers 23 and 28 is merely diagrammatic on the drawing and that in practice the entire liquid-containing chamber, including the two containers and the connection 29, would be constructed in any manner suitable to the particular installation, the heat exchange relationship being obtained in any practicable manner, for example, by clamping the heat transfer members to the several conduits 19, 21 and 25. Furthermore it is obvious that other portions of the low pressure side of the system may be employed for cooling the container 23 and that the effective cooling capacity of the low pressure side on the container 23 may be adjusted by changing the thermal resistance between the low side and the container in any suitable manner, the valve 26 for controlling the by-pass conduit 25 being illustrated merely as one suitable arrangement.

In the system of Fig. 2 only the compressor and driving motor, together with the heater control, have been illustrated. Except for the control, this system is the same as that of Fig. 1 and corresponding parts have been designated by the same numerals. The switch 31 in Fig. 2 is controlled by a bellows 34 having a temperature feeler bulb 35 in heat exchange relation with the motor 11. Preferably the element 35 is connected in a position to be responsive to the highest temperature portion of the motor. The operation of the system is the same as that of Fig. 2, the switch 31 being closed upon a predetermined rise in the temperature of the motor, thereby reducing the load on the system to maintain the motor load substantially constant and maintain the motor temperature below some predetermined limit.

The arrangement of Fig. 3 effects the control of the switch 31 in accordance with the electrical input to the motor 11 as determined by coils 36 and 37 responsive to the input voltage and current respectively at the motor terminals and which actuate a magnetic armature 38 connected to operate the switch in opposition to a spring 39. On a predetermined increase in input to the motor, the switch 31 is closed and operates to reduce the effective capacity of the system and consequently the load on the motor 11, the continued operation of the control effecting a substantially constant motor load throughout the operating periods of the refrigerating machine.

From the foregoing it is apparent that I have provided a simple arrangement for controlling the operation of a refrigerating machine having a flow restricting tube and that the control arrangement requires no moving parts in the refrigerant circuit. Although specific arrangements have been illustrated and described, other applications will be apparent to those skilled in the art. I do not, therefore, desire my invention to be limited to the details illustrated and described, and I intend by the appended claims to cover all modifications within the spirit and scope of my invention.

What I claim as new and desire to secure by Letters Patent of the United States is:

1. A refrigerating system including a compressor and a condenser and an evaporator connected in a closed refrigerant circuit, a flow restricting tube connected in said circuit between said condenser and said evaporator to control the flow of liquid refrigerant to said evaporator, a by-pass conduit connected between said condenser and said tube intermediate the ends of said tube, means providing a closed chamber having a first portion in heat exchange relationship with said by-pass and containing a body of volatile liquid, means for heating said portion of said chamber to vaporize liquid and force liquid out of said portion of said chamber into a second portion thereof, means utilizing refrigerant withdrawn from said evaporator for cooling said second portion of said chamber to condense vapor therein, and means responsive to a condition of operation of said system for energizing said heating means to control the flow of refrigerant through said by-pass for varying the rate of flow of refrigerant to said evaporator.

2. A refrigerating system including a compressor and a condenser and an evaporator connected in a closed refrigerant circuit, a flow restricting tube connected in said circuit between said condenser and said evaporator to control the flow of liquid refrigerant to said evaporator, a by-pass conduit connected between said condenser and said tube intermediate the ends of said tube, means providing a closed chamber having a first portion in heat exchange relationship with said by-pass and containing a body of volatile liquid, means for heating said portion of said chamber to vaporize liquid and force liquid out of said portion of said chamber into a second portion thereof, means utilizing refrigerant withdrawn from said evaporator for cooling said second portion of said chamber to condense vapor therein, means responsive to a condition of operation of said system for energizing said heating means to control the flow of refrigerant through said by-pass for varying the rate of flow of refrigerant to said evaporator, and cooling means arranged in heat exchange relation with said first portion of said chamber for cooling the vapor therein and effecting a rapid return of liquid thereto upon decrease in the energization of said heating means.

3. A refrigerating system including a compressor and a condenser and an evaporator connected in a closed refrigerant circuit, a flow restricting tube connected in said circuit between said condenser and said evaporator to separate the high and low pressure sides of said system and to control the flow of liquid refrigerant to said evaporator, a by-pass conduit connected between said condenser and said tube intermediate the ends of said tube, means providing a closed chamber having a first portion in heat exchange relationship with said by-pass and containing a body of volatile liquid, means for heating said portion of said chamber to vaporize liquid and force liquid out of said portion of said chamber into a second portion thereof, means utilizing refrigerant withdrawn from said evaporator for cooling said second portion of said chamber to condense vapor therein, means responsive to a condition of operation of said system for energizing said heating means to control the flow of refrigerant through said by-pass for varying the rate of flow of refrigerant to said evaporator, and means utilizing refrigerant on the low pressure side of said system for cooling the refrigerant within said first portion and for effecting a rapid return of liquid to said first portion upon decrease in the energization of said heating means.

4. A refrigerating system including a compressor and a condenser and an evaporator connected in a closed refrigerant circuit, a motor for driving said compressor, a flow restricting tube connected in said circuit between said condenser and said evaporator to control the flow of liquid refrigerant to said evaporator, a by-pass conduit connected between said condenser and said tube intermediate the ends of said tube, means providing a closed chamber having a first portion in heat exchange relationship with said by-pass and containing a body of volatile liquid, means for heating said portion of said chamber to vaporize liquid and force liquid out of said portion of said chamber into a second portion thereof, means utilizing refrigerant withdrawn from said evaporator for cooling said second portion of said chamber to condense vapor therein, and means dependent upon a condition of operation of said motor for energizing said heating means to control the flow of refrigerant through said by-pass for varying the rate of flow of refrigerant to said evaporator and maintaining the load on said motor substantially constant throughout each operating period thereof.

5. A refrigerating system including a compressor and a condenser and an evaporator connected in a closed refrigerant circuit, a motor for driving said compressor, a flow restricting tube connected in said circuit between said condenser and evaporator to control the flow of liquid refrigerant to said evaporator, a by-pass conduit connected between said condenser and said tube intermediate the ends of said tube, means providing a closed chamber having a first portion in heat exchange relationship with said by-pass and containing a body of volatile liquid, means for heating said portion of said chamber to vaporize liquid and force liquid out of said portion of said chamber into a second portion thereof, means utilizing refrigerant withdrawn from said evaporator for cooling said second portion of said chamber to condense vapor therein, and means dependent upon the pressure of the refrigerant on the high pressure side of said system for energizing said heating means to control the flow of refrigerant through said by-pass for varying the rate of flow of refrigerant to said evaporator and maintaining the load on said motor substantially constant throughout each operating period thereof.

6. A refrigerating system including a compressor and a condenser and an evaporator connected in a closed refrigerant circuit, a motor for driving said compressor, a flow restricting tube connected in said circuit between said condenser and said evaporator to control the flow of liquid refrigerant to said evaporator, a by-pass conduit connected between said condenser and said tube intermediate the ends of said tube, means providing a closed chamber having a first portion in heat exchange relationship with said by-pass and containing a body of volatile liquid, means for heating said portion of said chamber to vaporize liquid and force liquid out of said portion of said chamber into a second portion thereof, means utilizing refrigerant withdrawn from said evaporator for cooling said second portion of said chamber to condense vapor therein, and means dependent upon the temperature of said motor for energizing said heating means to control the flow of refrigerant through said by-pass for varying the rate of flow of refrigerant to said evaporator and maintaining the load on said motor substantially constant throughout each operating period thereof.

7. A refrigerating system including a compressor and a condenser and an evaporator connected in a closed refrigerant circuit, an electric motor for driving said compressor, a flow restricting tube connected in said circuit between said condenser and said evaporator to control the flow of liquid refrigerant to said evaporator, a by-pass conduit connected between said condenser and said tube intermediate the ends of said tube, means providing a closed chamber having a first portion in heat exchange relationship with said by-pass and containing a body of volatile liquid, means for heating said portion of said chamber to vaporize liquid and force liquid out of said portion of said chamber into a second portion thereof, means utilizing refrigerant withdrawn from said evaporator for cooling said second portion of said chamber to condense vapor therein, and means dependent upon the electrical input to said motor for energizing said heating means to control the flow of refrigerant through said by-pass for varying the rate of flow of refrigerant to said evaporator and maintaining the load on said motor substantially constant throughout each operating period thereof.

8. A refrigerating system including a compressor and a condenser and an evaporator connected in a closed refrigerant circuit, a flow restricting tube connected in said circuit between said condenser and said evaporator to control the flow of liquid refrigerant to said evaporator, a by-pass conduit connected between said condenser and said tube intermediate the ends of said tube, a first closed container arranged in heat exchange relation with said by-pass conduit, a second closed container arranged in heat exchange relation with said refrigerant circuit between said evaporator and the intake of said compressor, a conduit providing communication between the lower portions of said containers, a body of volatile liquid in said containers, means for heating said first chamber to vaporize liquid and force liquid out of said first container into said second container, and means responsive to a condition of operation of said system for energizing said heating means to reduce the quantity of liquid in said first container and to control the flow of refrigerant through said by-pass conduit for varying the rate of flow of refrigerant to said evaporator.

9. A refrigerating system including a compressor and a condenser and an evaporator connected in a closed refrigerant circuit, a flow restricting tube connected in said circuit between said condenser and said evaporator to control the flow of liquid refrigerant to said evaporator, a by-pass conduit connected between said condenser and said tube intermediate the ends of said tube, a first closed container arranged in heat exchange relation with said by-pass conduit, said by-pass conduit having a restricted portion between said container and said tube for limiting the flow of refrigerant therethrough, a second closed container arranged in heat exchange relation with said refrigerant circuit between said evaporator and the intake of said compressor, a conduit providing communication between the lower portions of said containers, a body of volatile liquid in said containers, means for heating said first chamber to vaporize liquid and force liquid out of said first container into said second container, means responsive to a condition of operation of said system for energizing said heating means to control the flow of refrigerant to said by-pass conduit for varying the rate of flow of refrigerant to said evaporator, and means for utilizing refrigerant discharged from the outlet of said tube for cooling the liquid in said first container and the refrigerant in said by-pass.

ALBERT B. HUBBARD.

No references cited.